(12) United States Patent
Sadowski et al.

(10) Patent No.: US 11,728,103 B2
(45) Date of Patent: Aug. 15, 2023

(54) ELECTRICAL APPARATUS WITH DOOR MOUNTED ROTARY HANDLE FOR OPERATING AN ELECTRICAL DEVICE AND AN INTERLOCK MECHANISM

(71) Applicant: ABB Schweiz AG, Baden (CH)

(72) Inventors: Mateusz A. Sadowski, Pierzchnica (PL); Mateusz Sekula, Bielsko-Biala (PL)

(73) Assignee: ABB Schweiz AG, Baden (CH)

( * ) Notice: Subject to any disclaimer, the term of this patent is extended or adjusted under 35 U.S.C. 154(b) by 421 days.

(21) Appl. No.: 16/935,897

(22) Filed: Jul. 22, 2020

(65) Prior Publication Data

US 2022/0028631 A1    Jan. 27, 2022

(51) Int. Cl.
*H01H 9/22* (2006.01)
*H01H 3/32* (2006.01)

(52) U.S. Cl.
CPC ............... *H01H 9/22* (2013.01); *H01H 3/32* (2013.01)

(58) Field of Classification Search
CPC ............ H01H 3/32; H01H 9/22; H01H 71/52; H01H 9/223; H02G 5/08
See application file for complete search history.

(56) References Cited

U.S. PATENT DOCUMENTS

| | | | |
|---|---|---|---|
| 2,888,529 A | 5/1959 | Platz | |
| 2,984,789 A | 5/1961 | O'Brien | |
| 3,007,016 A | 10/1961 | Cutler | |
| 3,299,232 A | 1/1967 | Geppert | |
| 3,299,233 A | 1/1967 | Sciba | |
| 3,312,872 A | 4/1967 | Davis | |
| 3,657,606 A | 4/1972 | Greger et al. | |
| 4,912,599 A | 3/1990 | Wittmer | |
| 4,957,447 A | 9/1990 | Hibbert et al. | |
| 6,023,030 A | 2/2000 | Latimer et al. | |
| 7,311,538 B2 | 12/2007 | West | |
| 7,368,675 B2 | 5/2008 | Ishido et al. | |
| 7,965,493 B2 * | 6/2011 | Leeman | H02B 11/127 361/615 |
| 8,847,088 B2 | 9/2014 | Bhathija et al. | |
| 9,425,588 B2 | 8/2016 | Fischer et al. | |

(Continued)

FOREIGN PATENT DOCUMENTS

| | | |
|---|---|---|
| CA | 649166 | 9/1962 |
| CA | 819217 | 7/1968 |

(Continued)

OTHER PUBLICATIONS

European Patent Office, International Search Report in International Patent Application No. PCT/IB2021/056601, 6 pp. (dated Nov. 15, 2021).

(Continued)

*Primary Examiner* — Edwin A. Leon
(74) *Attorney, Agent, or Firm* — Leydig, Voit & Mayer, Ltd.

(57) ABSTRACT

An electrical system includes an enclosure for housing an electrical device. The enclosure includes a door with an operating handle connected to a shaft when the door is closed, which can then be used to turn the electrical device on or off. The shaft rotation is further operable to simultaneously displace an interlock mechanism for engagement or disengagement to a busway structure.

20 Claims, 4 Drawing Sheets

(56) References Cited

U.S. PATENT DOCUMENTS

| | | |
|---|---|---|
| 9,679,733 B2 | 6/2017 | Dunker |
| 10,211,019 B2 * | 2/2019 | Roopnarine ......... H01H 71/521 |
| 10,403,454 B2 | 9/2019 | Singh et al. |
| 2009/0107819 A1 | 4/2009 | Samudrikam et al. |
| 2016/0099117 A1 | 4/2016 | Dunker |

FOREIGN PATENT DOCUMENTS

| | | |
|---|---|---|
| CA | 787522 | 11/1968 |
| CN | 2153885 | 1/1994 |
| CN | 1093329 C | 5/2009 |
| CN | 108767791 | 6/2018 |
| CN | 107623296 | 1/2019 |
| JP | 2005149918 | 6/2005 |

OTHER PUBLICATIONS

European Patent Office, Written Opinion in International Patent Application No. PCT/IB2021/056601, 12 pp. ((dated Nov. 15, 2021).

* cited by examiner

ELECTRICAL APPARATUS WITH DOOR MOUNTED ROTARY HANDLE FOR OPERATING AN ELECTRICAL DEVICE AND AN INTERLOCK MECHANISM

TECHNICAL FIELD

The present application generally relates to electrical systems, such as busway systems with tap-off devices, and more particularly, but not exclusively, to electrical systems with an enclosure for an electrical device that includes a door mounted rotary handle that operates the electrical device in conjunction with an interlock mechanism.

BACKGROUND

Electrical systems and operating safety remain an area of interest. Some existing systems have various shortcomings, drawbacks and disadvantages relative to certain applications. For example, in some busway systems, tap-off devices are provided with handles on a wall of the enclosure that are toggled with movement from an ON position to an OFF position, or from an OFF position to an ON position, to change a status of the electrical device. Other systems employ interlock devices in which a handle is provided to move a connected interlock device that prevents removal of the device. However, these systems require many moving parts and internal components, and do not provide for door operation in conjunction with interlock securement. Accordingly, there remains a need for further contributions in this area of technology.

SUMMARY

One embodiment of the present application is a unique electrical system with an electrical device in an enclosure and an interlock mechanism. Another embodiment is a unique handle system for providing access to the electrical device, changing a status of the electrical device, and for operating an interlock mechanism, that employs a single shaft actuating mechanism. Other embodiments include apparatuses, systems, devices, hardware, methods, and combinations for electrical systems, operating handles, interlock mechanisms, and related components. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
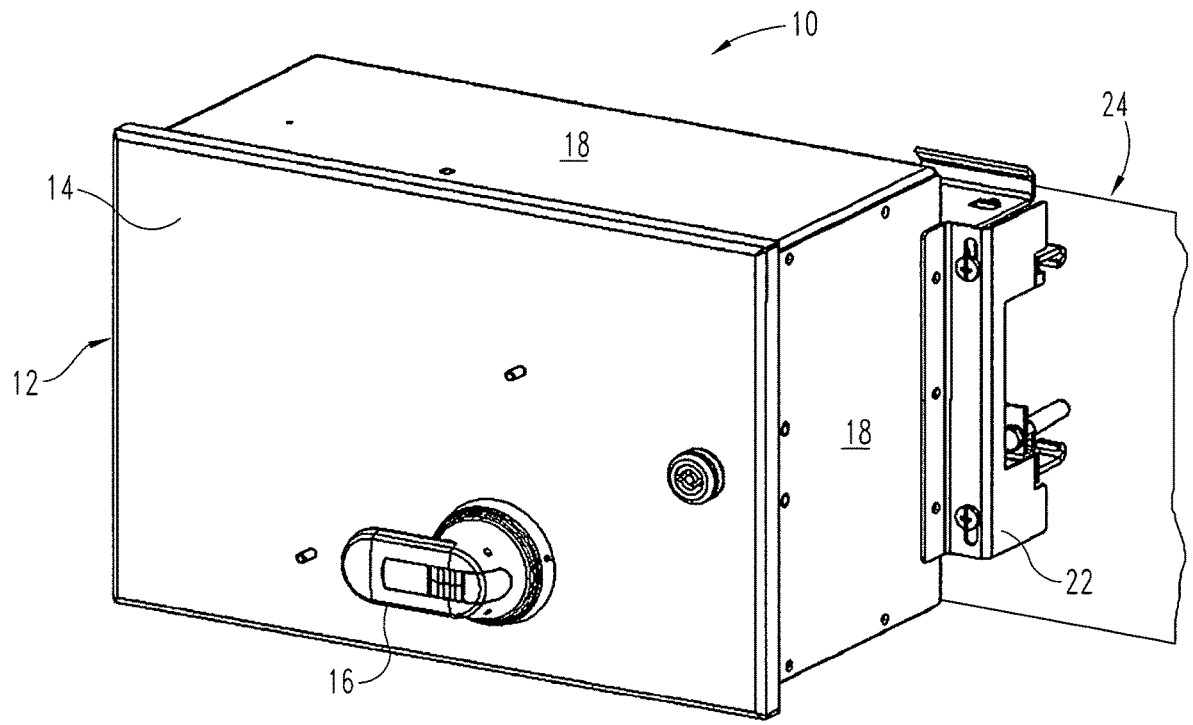
FIG. 1 illustrates a perspective view of a non-limiting example of an electrical system in accordance with an embodiment of the present application looking at a front side thereof.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
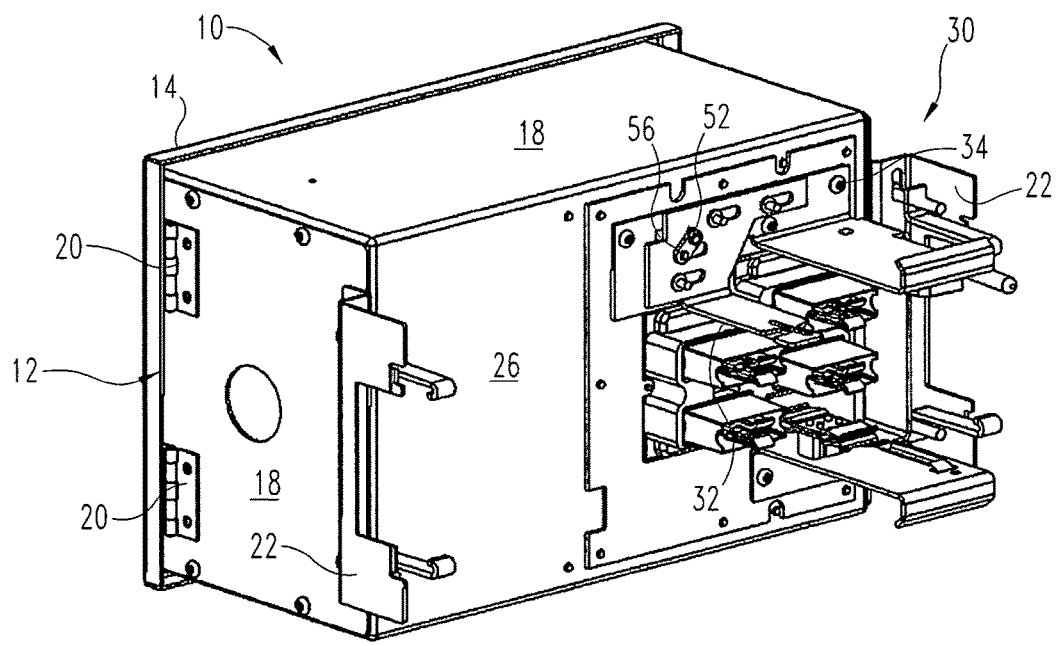
FIG. 2 is another perspective view of the electrical system of FIG. 1 looking at a back side thereof.

Referring to FIGS. 1-2, some aspects of a non-limiting example of an electrical system 10 in accordance with an embodiment of the present disclosure are schematically depicted in front and back perspective views of a cabinet or enclosure 12. Electrical system 10 includes a cabinet or enclosure 12 having a door 14 with an operating handle 16 mounted to an external side of door 14. Operating handle 16 includes an L-shape to be readily grasped by an operator for rotation, but any suitable shape or configuration for operating handle 16 is contemplated. Door 14 is pivotally mounted to one of a plurality of sidewalls 18 of enclosure 12 with, for example, one or more hinges 20. Door 14 may also be a removable access panel in other embodiments.

In the illustrated embodiment, enclosure 12 is rectangular, but any suitable shape and/or configuration for enclosure 12 is contemplated. Door 14 provides access to the interior of enclosure 12, e.g., to permit access to an electrical device 28 (FIGS. 3-4), electrical connections thereto, and any other electrical or other components housed within enclosure 12. Enclosure 12 may be any electrical device enclosure. As used herein, the term "electrical device" should construed broadly to include any suitable electrical switching device, including circuit breakers, busway plug breakers/switches, and/or busway tap-off devices that are capable of being toggled on and off. Enclosure 12 may also include side brackets 22 extending from a rear wall 26 that is opposite of door 14. Side brackets 22 may be provide for mounting enclosure 12 to, for example, a busway structure 24, shown schematically in FIG. 1. Busway structure 24 may be any suitable structure associated with an electrical busway system.

Figure 3:
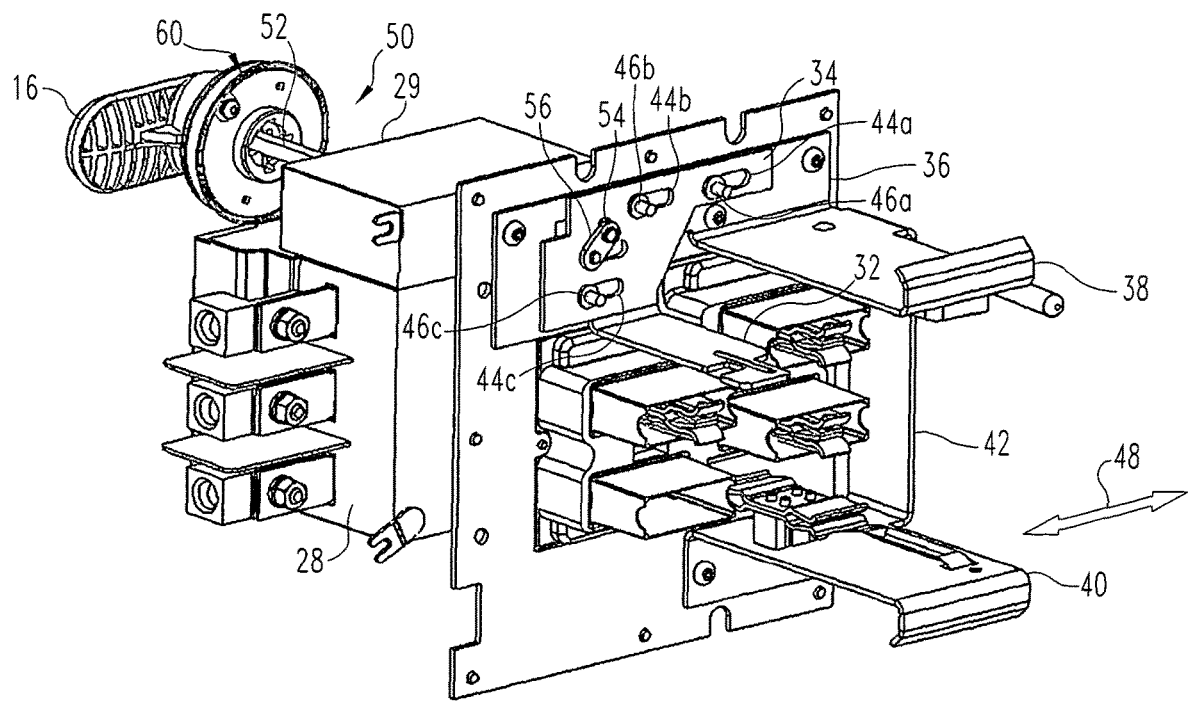
FIG. 3 is a perspective view looking at a back side of a handle system and interlock mechanism with the enclosure removed to illustrate some aspects of a non-limiting example of the electrical system of FIG. 1 in accordance with an embodiment of the present application.
Figure 4:
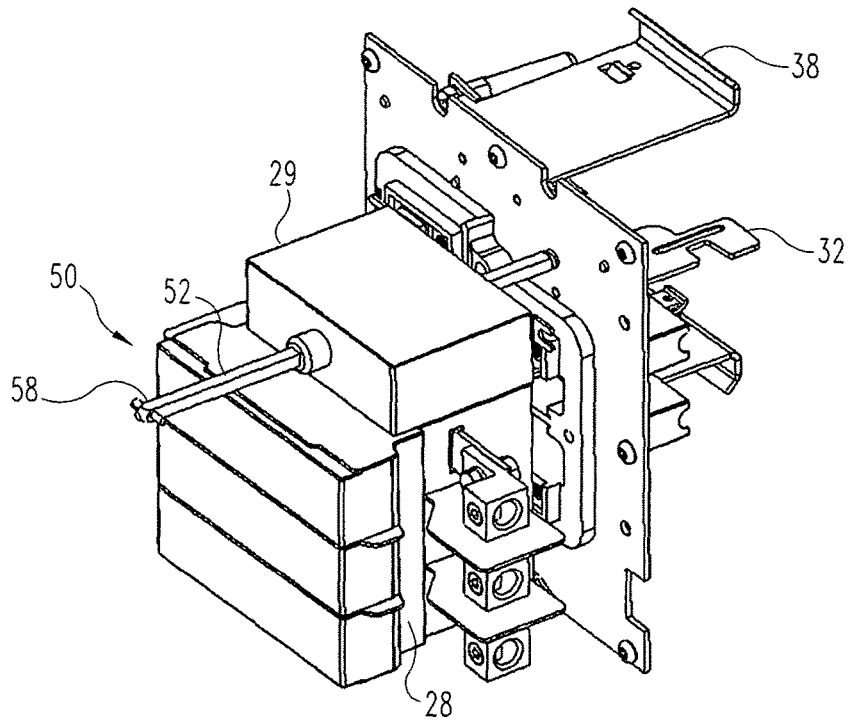
FIG. 4 is a front side perspective view of the interlock mechanism of FIG. 3 with the handle removed.

Referring to FIGS. 3-4, operating handle 16 is shown (in FIG. 3) with an actuating system 50 and an interlock mechanism 30. Interlock mechanism 30 is operable to removably couple or engage the electrical system 10 to, for example, the busway structure 24. Interlock mechanism 30 includes an interlock device 32 extending outwardly from a slide plate 34. Slide plate 34 is movably mounted to a mounting plate 36 that is engaged to rear wall 26 of enclosure 12. Interlock mechanism 30 further includes first and second U-shaped mounting arms 38, 40 connected by a cross member 42 that are also engaged to rear wall 26. Mounting arms 38, 40 may be provided for mounting enclosure 12 to busway structure 24.

Slide plate 34 includes first, second, and third slots 44a, 44b, 44c that receive respective ones of first, second, and third studs 46a, 46b, 46c extending from mounting plate 36 through slide plate 34. As discussed further below, the studs 46a, 46b, 46c retain the slide plate 34 on mounting plate 36 while allowing interlock device 32 to be displaced linearly back and forth as indicated by arrow 48 to interlock the electrical system 10 with the busway structure 24 when electrical device 28 is switched on by operating handle 16, as discussed further below.

In order to displace interlock device 32, slide plate 34 is couple to actuating system 50 with an interlock cam 56 operable by a shaft 52. Interlock cam 56 includes a linking arm 62 have a first end fixedly coupled to a first end 54 of shaft 52 and a second end rotatably coupled to slide plate 34. The second end 58 of shaft 52 is connected to a receptacle 60 of operating handle 16 when door 14 is closed. Operating handle 16 is operable to engage shaft 52 in receptacle 60 when door 14 is closed and rotate first shaft 52 and operate to pivot linking arm 62 and displace interlock device 32 by translating slide plate 34 as indicated by arrows 48, depending on the direction of rotation of operating handle 16.

Figure 5:
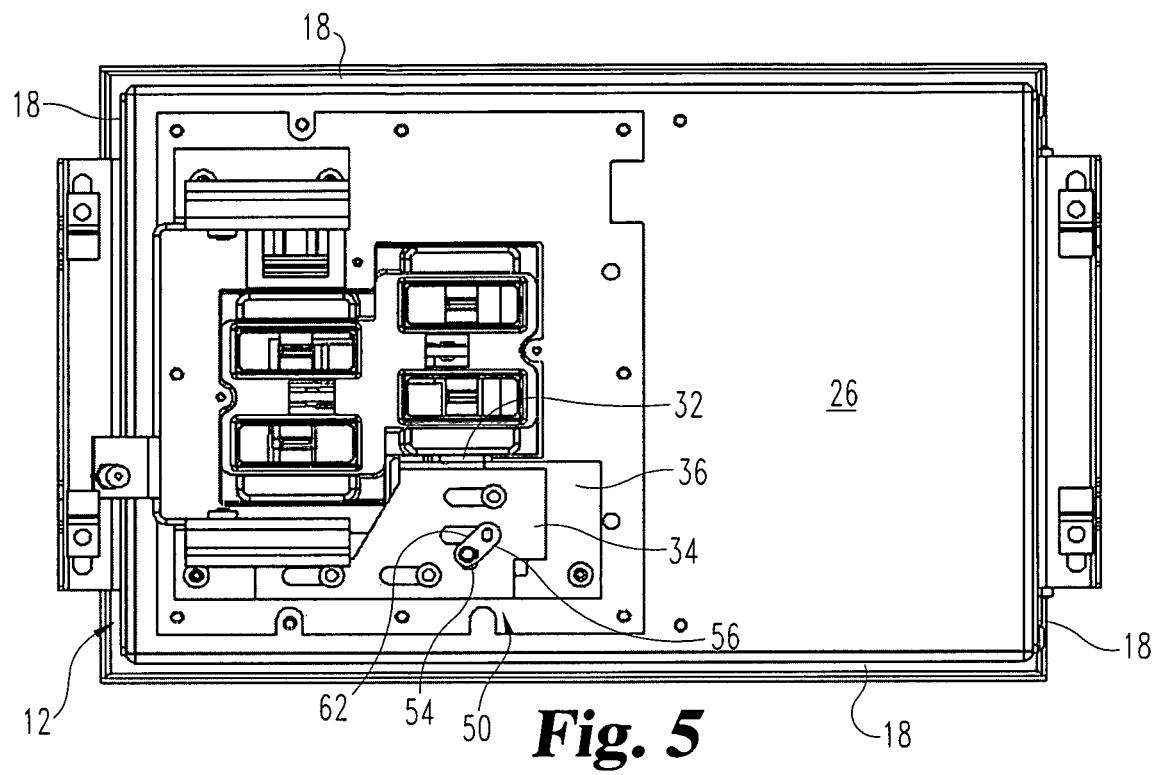
FIG. 5 is a back elevation view of the electrical system with the operational status of the handle system corresponding to an OFF (OPEN) position.

Receptacle 60 can be attached to operating handle 16 on door 14 so that operating handle 16 and receptacle 60 move with the movement of door 14, and engage shaft 52 at its second end 58 only when door 14 is closed. Shaft 52 further extends through a switch actuator 29 of electrical device 28 so that rotation of shaft 52 turns the electrical device 28 on and off as the interlock device is engaged and disengaged from the busway structure 24. Shaft 52 can therefore be used to turn electrical device 28 off and on by rotating operating handle 16 between an OFF position (FIGS. 5-6) and an ON position (FIGS. 7-8.) Shaft 52 is keyed to operating handle 16 in receptacle 60 so that shaft 52 rotates with rotation of operating handle 16 and/or in response to electrical device 28 tripping.

Figure 6:
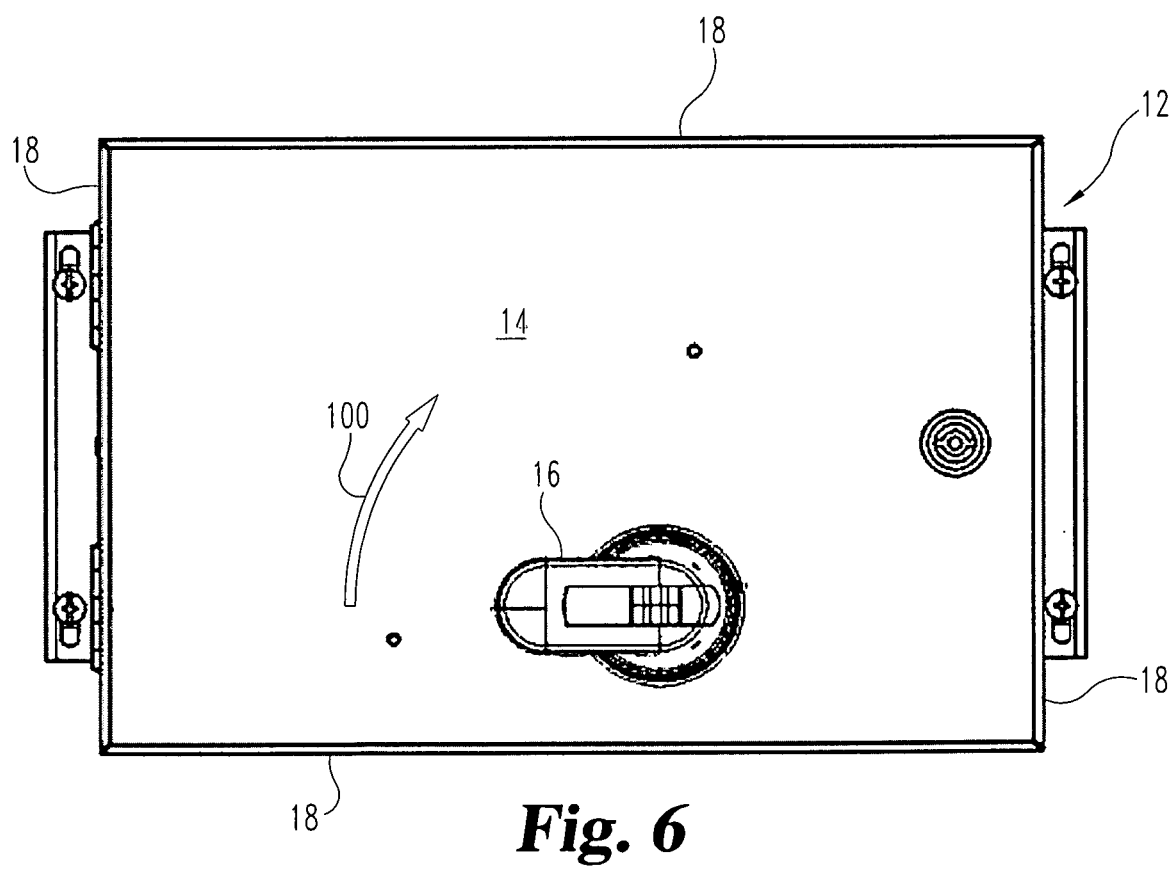
FIG. 6 is a front elevation view of the electrical system with the operational status of the handle system corresponding to an OFF (OPEN) position.
Figure 7:
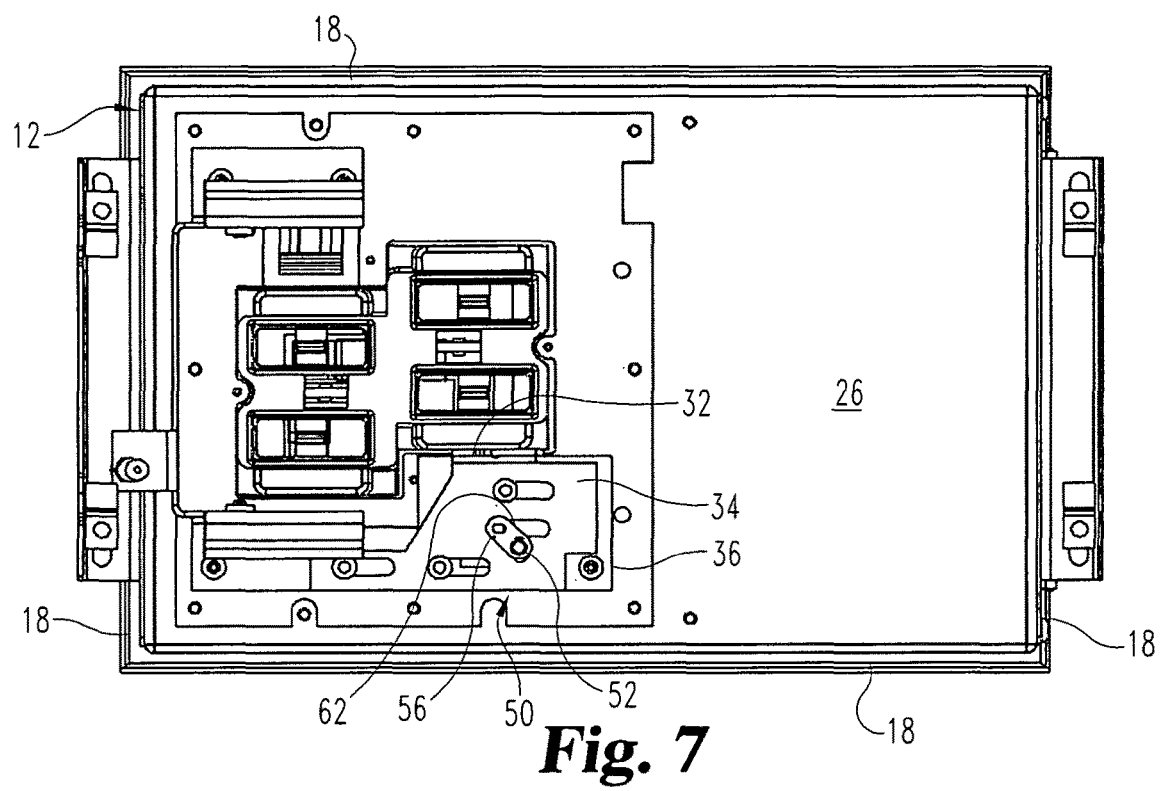
FIG. 7 is a back elevation view of the electrical system with the operational status of the handle system corresponding to an ON (CLOSED) position.
Figure 8:
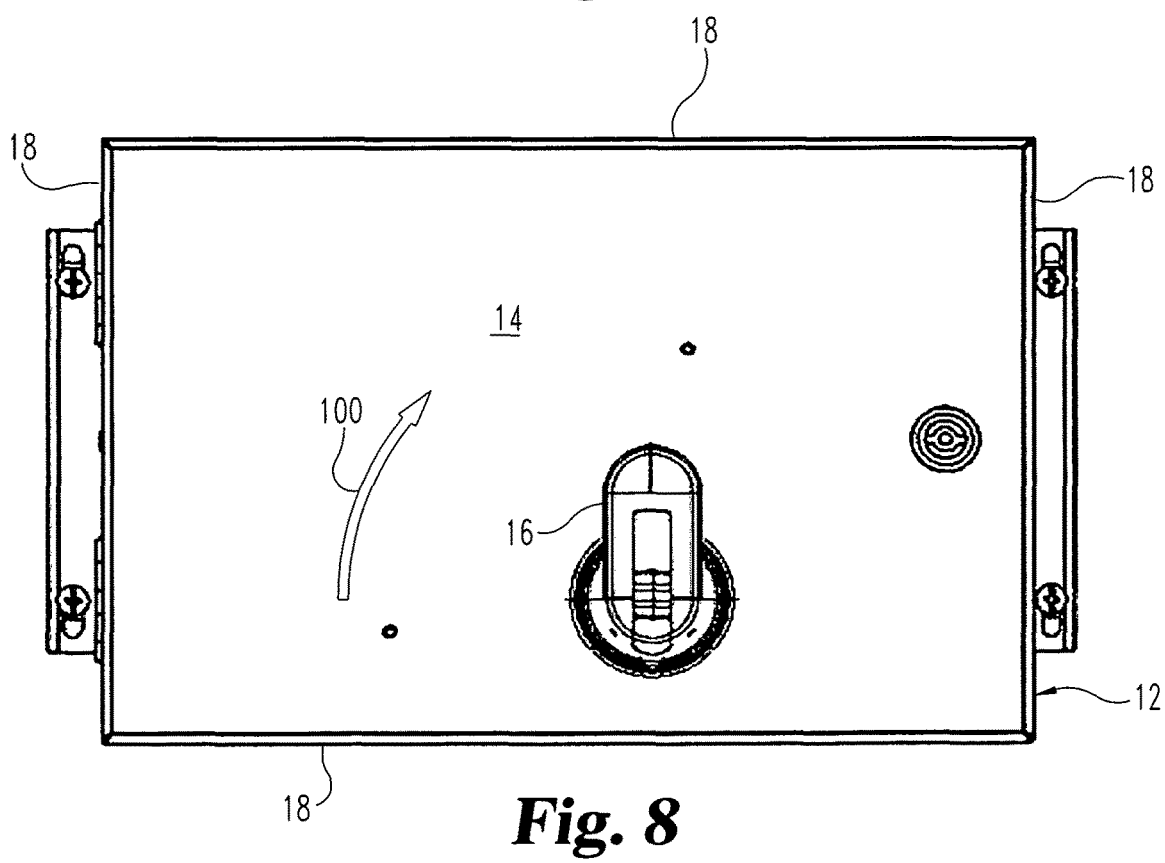
FIG. 8 is a front elevation view of the electrical system with the operational status of the handle system corresponding to an ON (CLOSED) position.

Referring further to FIGS. 5-8, operation of electrical device 28 when disposed in enclosure 12 is illustrated. Shaft 52 is operative to rotate via rotation of operating handle 16 to turn electrical device 28 on and off. In one form, a clockwise rotation 100 from an OFF (OPEN) position as shown in FIG. 6 90 degrees to an ON (CLOSED) position as shown in FIG. 8 is operative to turn electrical device 28 from off to on, whereas a counterclockwise rotation is operative to turn electrical device 28 off. Door 14 and/or operating handle 16 may include an indicator to indicate whether the electrical device 28 is on or off depending on the position of operating handle 16. In other embodiments, the rotation directions for turning electrical device 28 on and off may be reversed.

When door 14 is open, operating handle 16 is disconnected from shaft 52. During normal operation, door 14 is closed, and external operating handle 16 is coupled to shaft 52 through door 14, and is operative to rotate shaft 52 to turn electrical device 28 on and off as discussed above. Simultaneously, rotation of shaft 52 displaces interlock device 32. In particular, rotation of operating handle 16 to turn electrical device 28 on and off also rotates shaft 52 to pivot linking arm 62, which in turn displaces interlock device 32 and engage or lock interlock device 32 to busway structure 24 when electrical device 28 is on and disengage or unlock interlock device 32 from the busway structure 24 when the electrical device 28 is off.

In one embodiment, the receptacle 60 is a non-circular slot that receives a non-circular perimeter of shaft 52 at second end 58. This engagement allows the rotation of operating handle 16 to be translated to shaft 52. In addition, shaft 52 can be readily received into receptacle 60 as the door is closed provided that operating handle 16 is in the proper orientation (the OFF or OPEN position) for shaft 52 to be received into receptacle 60. In other embodiments, other cooperative engagement relationships between operating handle 16 and shaft 52 when door 14 is closed are contemplated.

Various aspects of the present disclosure are contemplated. According to one aspect, an electrical apparatus includes an enclosure having a door movable for access to an interior of the enclosure and an electrical device disposed in the interior of the enclosure that is operable to be turned on and off. The apparatus includes an operating handle on the door outside the enclosure that is operable to open and close the door and a shaft engaged to the electrical device. The apparatus includes an interlock mechanism including an interlock device. The shaft includes a first end connected to the interlock device and a second end that is engaged to the operating handle with the door closed. Rotation of the external operating handle with the door closed rotates the shaft to turn the electrical device on or off and further displaces the interlock device for engagement or disengagement with a busway structure.

In one embodiment, the interlock mechanism includes an interlock cam connected to the first end of the shaft. In one refinement, the interlock mechanism includes a slide plate connecting the interlock device and the interlock cam. In one refinement, the interlock cam includes a pivotable linking arm connecting the slide plate to the first end of the shaft. In one refinement, the slide plate is slidably mounted on an exterior wall of the enclosure.

In one refinement, the slide plate includes at least three slots, and the slide plate slides along at least three studs extending through respective ones of the at least three slots, and the at least three studs are mounted to the enclosure. In one refinement, rotation of the shaft pivots the linking arm which translates the slide plate along the at least three studs to displace the interlock device for engagement or disengagement with the busway structure. In one refinement, the linking arm includes a first end fixed to the first end of the shaft, and an opposite second end pivotally coupled to the slide plate.

In one embodiment, the electrical device is a busway tap-off device. In one embodiment, the operating handle is L-shaped.

According to another aspect of the present disclosure a system is provided for turning a shaft to operate an electrical device in an enclosure. The system includes an operating handle mountable on a door of the enclosure and a shaft engaged to the electrical device in the enclosure. The shaft is engaged to the operating handle with the door closed and is disengaged from the operating handle with the door open. The system includes an interlock mechanism including an interlock device. The shaft includes a first end connected to the interlock device and a second end that is engaged to the operating handle with the door closed. Rotation of the handle assembly rotates the shaft to turn the electrical device on or off and further displaces the interlock device for engagement or disengagement with a busway structure In one embodiment, the interlock mechanism includes a slide plate connected to the first end of the shaft and to the interlock device. In one refinement, the interlock mechanism includes an interlock cam connecting the first end of the shaft to the slide plate.

In one refinement, rotation of the shaft translates the slide plate relative to the enclosure to displace the interlock device for engagement or disengagement with the busway structure. In one refinement, the interlock cam includes a linking arm having a first end fixed to the first end of the shaft, and an opposite second end pivotally coupled to the slide plate.

According to another aspect of the present disclosure, an electrical system includes an enclosure having a door for access to an interior of the enclosure, an electrical device in the interior of enclosure, and a shaft extending from the electrical device. The electrical system also includes an operating handle disposed outside the enclosure that is coupled to a first end of the shaft through the door with the door closed and uncoupled from the first and of the shaft with the door open. The electrical system further includes an interlock mechanism for selectively engaging the enclosure to a busway structure. The interlock mechanism is engaged to a second end of the shaft opposite the first end. With the door closed, rotation of the shaft via the operating handle turns the electrical device on or off and displaces the interlock mechanism to engage or disengage the busway structure.

In one embodiment, the shaft is engaged to the interlock mechanism via an interlock cam that is engaged to the second end of the shaft. In one refinement, the interlock mechanism includes a slide plate connected to the first end of the shaft and an interlock device extending from the slide plate for engaging the busway structure.

In one refinement, rotation of the shaft translates the slide plate relative to the enclosure to displace the interlock device for engagement or disengagement with the busway structure. In one refinement, the interlock cam includes a linking arm having a first end fixed to the first end of the shaft, and an opposite second end pivotally coupled to the slide plate.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical apparatus, comprising:
    an enclosure having a door movable for access to an interior of the enclosure;
    an electrical device disposed in the interior of the enclosure, the electrical device being operable to be turned on and off;
    an operating handle on the door outside the enclosure that is operable to open and close the door, the operating handle comprising a receptacle, the operating handle, including the receptacle, moving with a movement of the door;
    a shaft engaged to the electrical device; and
    an interlock mechanism including an interlock device, the shaft including a first end connected to the interlock device and a second end that, only while the door is closed, is engaged to the operating handle, via the receptacle, wherein rotation of the external operating handle with the door closed rotates the shaft to turn the electrical device on or off and further displaces the interlock device for engagement or disengagement with a busway structure.

2. The electrical apparatus of claim 1, wherein the interlock mechanism includes an interlock cam connected to the first end of the shaft.

3. The electrical apparatus of claim 2, wherein the interlock mechanism includes a slide plate connecting the interlock device and the interlock cam.

4. The electrical apparatus of claim 3, wherein the interlock cam includes a pivotable linking arm connecting the slide plate to the first end of the shaft.

5. The electrical apparatus of claim 4, wherein the slide plate is slidably mounted on an exterior wall of the enclosure.

6. The electrical apparatus of claim 5, wherein the slide plate includes at least three slots, and the slide plate slides along at least three studs extending through respective ones of the at least three slots, the at least three studs being mounted to the enclosure.

7. The electrical apparatus of claim 5, wherein rotation of the shaft pivots the linking arm which translates the slide plate along the at least three studs to displace the interlock device for engagement or disengagement with the busway structure.

8. The electrical apparatus of claim 5, wherein the linking arm includes a first end fixed to the first end of the shaft, and an opposite second end pivotally coupled to the slide plate.

9. The electrical apparatus of claim 1, wherein the electrical device is a busway tap-off device.

10. The electrical apparatus of claim 1, wherein the operating handle is L-shaped.

11. A system for turning a shaft to operate an electrical device in an enclosure, comprising:
    an operating handle mountable on a door of the enclosure, the operating handle comprising a receptacle, the operating handle, including the receptacle, moving with a movement of the door;
    a shaft engaged to the electrical device in the enclosure, wherein the shaft is engaged, via the receptacle, to the operating handle only with the door closed and is disengaged from the operating handle with the door open; and
    an interlock mechanism including an interlock device, the shaft including a first end connected to the interlock device and a second end that is engaged, via the receptacle, to the operating handle only with the door closed, wherein rotation of the handle assembly rotates the shaft to turn the electrical device on or off and further displaces the interlock device for engagement or disengagement with a busway structure.

12. The system of claim 11, wherein the interlock mechanism includes a slide plate connected to the first end of the shaft and to the interlock device.

13. The system of claim 12, wherein the interlock mechanism includes an interlock cam connecting the first end of the shaft to the slide plate.

14. The system of claim 13, wherein rotation of the shaft translates the slide plate relative to the enclosure to displace the interlock device for engagement or disengagement with the busway structure.

15. The system of claim 13, wherein the interlock cam includes a linking arm having a first end fixed to the first end of the shaft, and an opposite second end pivotally coupled to the slide plate.

16. An electrical system, comprising:
an enclosure having a door for access to an interior of the enclosure;
an electrical device in the interior of enclosure and a shaft extending from the electrical device;
an operating handle comprising a receptacle, disposed outside the enclosure, moving with a movement of the door, coupled, via the receptacle, to a first end of the shaft through the door with the door closed only and uncoupled from the first end of the shaft with the door open; and
an interlock mechanism for selectively engaging the enclosure to a busway structure, the interlock mechanism being engaged to a second end of the shaft opposite the first end, wherein with the door closed rotation of the shaft via the operating handle turns the electrical device on or off and displaces the interlock mechanism to engage or disengage the busway structure.

17. The electrical system of claim 16, wherein the shaft is engaged to the interlock mechanism via an interlock cam that is engaged to the second end of the shaft.

18. The electrical system of claim 17, wherein the interlock mechanism includes a slide plate connected to the first end of the shaft and an interlock device extending from the slide plate for engaging the busway structure.

19. The electrical system of claim 18, wherein rotation of the shaft translates the slide plate relative to the enclosure to displace the interlock device for engagement or disengagement with the busway structure.

20. The electrical system of claim 19, wherein the interlock cam includes a linking arm having a first end fixed to the first end of the shaft, and an opposite second end pivotally coupled to the slide plate.

* * * * *